United States Patent
Zhang et al.

(10) Patent No.: US 12,530,421 B2
(45) Date of Patent: Jan. 20, 2026

(54) MAINTAINING BACKWARD COMPATIBILITY OF URL CONTENT REDIRECTION

(71) Applicant: Omnissa, LLC, Mountain View, CA (US)

(72) Inventors: Huanhuan Zhang, Beijing (CN); Yue Hao, Beijing (CN); Zhaohan Ren, Beijing (CN); Haiwei Zhao, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 59 days.

(21) Appl. No.: 18/378,838

(22) Filed: Oct. 11, 2023

(65) Prior Publication Data
US 2025/0124097 A1    Apr. 17, 2025

(51) Int. Cl.
  *G06F 16/955* (2019.01)
  *G06F 16/958* (2019.01)
(52) U.S. Cl.
  CPC ........ *G06F 16/9566* (2019.01); *G06F 16/986* (2019.01)
(58) Field of Classification Search
  CPC ............................ G06F 16/9566; G06F 16/986
  See application file for complete search history.

(56) References Cited

U.S. PATENT DOCUMENTS

| | | | | |
|---|---|---|---|---|
| 10,574,721 | B2* | 2/2020 | Bazzi | H04L 67/02 |
| 2005/0246444 | A1* | 11/2005 | Koehane | H04L 67/289 |
| | | | | 709/227 |
| 2012/0209954 | A1* | 8/2012 | Wright | H04L 67/141 |
| | | | | 709/217 |
| 2012/0290968 | A1* | 11/2012 | Cecora | G06F 16/951 |
| | | | | 715/780 |
| 2014/0108496 | A1* | 4/2014 | Heller | G06F 16/954 |
| | | | | 709/203 |
| 2020/0387273 | A1* | 12/2020 | Guta | G06F 40/143 |
| 2021/0389846 | A1* | 12/2021 | Ens | G06F 9/541 |
| 2023/0026368 | A1* | 1/2023 | Silverstein | G06F 16/986 |
| 2025/0053990 | A1* | 2/2025 | Bailey | G06Q 40/03 |

* cited by examiner

*Primary Examiner* — Asher D Kells
(74) *Attorney, Agent, or Firm* — Kim & Stewart LLP

(57) ABSTRACT

The disclosure provides a method for launching a browsing session. The method generally includes triggering a browser extension popup of a browser extension at a first device; requesting, by the browser extension popup, one or more uniform resource locator (URL) redirection rules, wherein the one or more URL redirection rules are associated with one or more URLs; receiving the one or more URL redirection rules; receiving, by the browser, a URL; sending, from the first device to a second device, a request to launch another browser at the second device based on the received URL matching at least one of the one or more URLs associated with the one or more URL redirection rules; sending, from the first device to the second device, the received URL; and displaying the launched browser of the second device.

17 Claims, 12 Drawing Sheets

MAINTAINING BACKWARD COMPATIBILITY OF URL CONTENT REDIRECTION

INTRODUCTION

Aspects of the present disclosure relate to redirecting uniform resource locator (URL) content from a web browser running on one device to another web browser running on another device.

In a virtual desktop infrastructure (VDI) environment, a local client device (e.g., a personal computer (PC) or mobile device) can access a remote desktop (also referred to as a virtual desktop) or remote application that is running on a remote device (e.g., a virtual device, such as a virtual machine (VM), or a physical device, such as a physical server) and displayed at the local client device. For instance, a virtual desktop may be hosted on a central infrastructure known as VDI, and may be rendered on a client device using a remote display protocol. At the client device, a user may interact with the virtual desktop using peripheral devices (e.g., keyboard and/or mouse) associated with the client device, and operating system (OS) events generated based on the user's inputs are captured by a VDI client (e.g., a user-side interface of the virtual desktop) of the client device and redirected from the client device to the remote device on which the virtual desktop is located.

An end user (e.g., a user of a local client device) of a virtual desktop may not only use applications installed on the virtual desktop, but also use local applications (e.g., installed on the local client device) to perform some functionality. Security practices and policies can limit where an application is installed, for example on the local client device or the virtual desktop. Security practices and policies can limit what content is accessed by the application (e.g., certain files or URLs are prevented from being accessed by an application installed on the virtual desktop or the local client device). Further, security practices and policies can limit what resources are utilized by the application; for example, an application installed on the virtual desktop may be preferred due in part to installed plugins, extensions, or other customizations. As an illustrative example, a user who is accessing URL content (e.g., viewing and/or interacting with digital information or resources that are accessible via a specific URL, including but not limited to web pages, images, videos, or any other type of data that can be displayed or interacted with through a web browser) may experience issues accessing such content using a browser of the local client device or such content may be inaccessible from the local client device but is accessible by a browser of the virtual desktop.

In some cases, if a user working on a local desktop of the local client device wants to access a URL, the user must first switch from the local desktop, open a browser on the virtual desktop, and transfer the URL from the local desktop to the browser of the virtual desktop—for example, by a copy and paste operation or by manual entry of the URL when a copy and paste operation is not allowed. Similarly, if a user is working on the virtual desktop and wants to access a URL that is inaccessible by a browser of the virtual desktop, the user must switch to the local desktop, open a browser on the local desktop, and transfer the URL from the virtual desktop to the browser of the local desktop—for example, by a copy and paste operation or by manual entry of the URL when a copy and paste operation is not allowed. Transferring URLs and switching between the remote and local desktops takes time and reduces efficiency for the user. Further, for a user that is using only one display screen/monitor, switching between remote and local desktop provides a poor user experience and further reduces the user's productivity.

Accordingly, there is a need in the art for improved remote display techniques to redirect a URL to a local browser or remote browser.

It should be noted that the information included in the Background section herein is simply meant to provide a reference for the discussion of certain embodiments in the Detailed Description. None of the information included in this Background should be considered as an admission of prior art.

SUMMARY

An embodiment disclosed herein includes a method for performing URL content redirection in accordance with URL redirection rules by updating the URL redirection rules accessible by a first browser, redirecting a URL from the first browser to a second browser associated with a redirection rule, and causing the content associated with the redirected URL to be displayed via the second browser. The method generally includes triggering a browser extension popup of a browser extension at a first device; requesting, by the browser extension popup, one or more uniform resource locator (URL) redirection rules, wherein the one or more URL redirection rules are associated with one or more URLs; receiving the one or more URL redirection rules and storing the one or more URL redirection rules in a location accessible to a browser within which the browser extension functions; receiving, by the browser, a URL; sending, from the first device to a second device, a request to launch another browser at the second device when the received URL matches at least one of the one or more URLs associated with the one or more URL redirection rules; sending, from the first device to the second device, the received URL; and displaying the launched browser of the second device.

Further embodiments include one or more non-transitory computer-readable storage media storing instructions that, when executed by a computer system, cause the computer system to perform the method set forth above, and a computer system including at least one processor and one or more memories configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
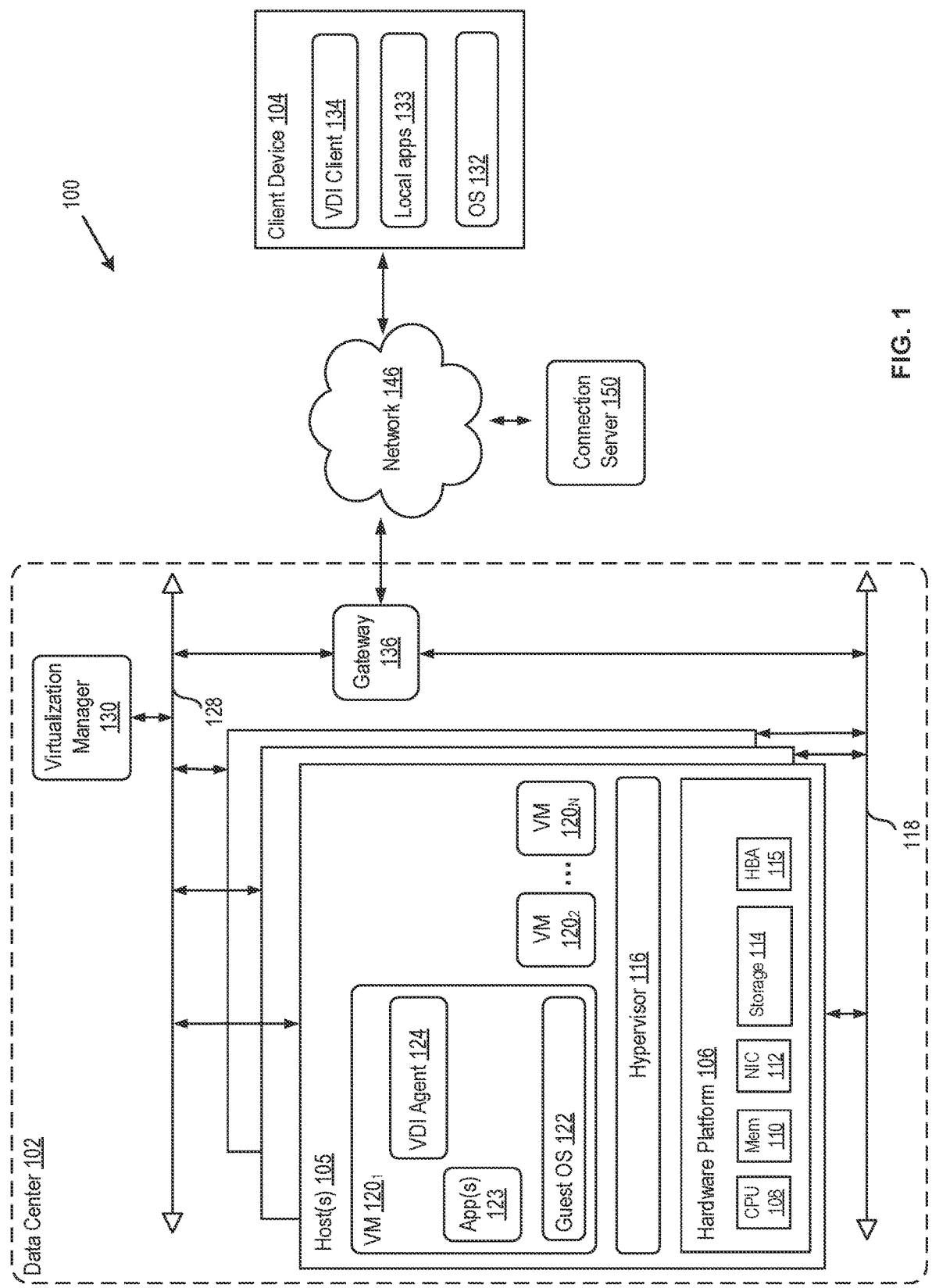
FIG. 1 depicts a block diagram of a virtualized desktop infrastructure system in which one or more embodiments of the present disclosure may be implemented.

Aspects of the present disclosure provide apparatuses, methods, processing systems, and computer-readable mediums for performing URL content redirection in accordance with URL redirection rules by updating the URL redirection rules accessible by a first browser, redirecting a URL from the first browser to a second browser associated with a redirection rule, and causing the content associated with the redirected URL to be displayed via the second browser. In examples, URL content redirection can be performed using a browser extension. A browser extension is a software module or add-on that can be installed and run within a web browser to enhance the web browser's functionally and customize the user's browsing experience. Browser extensions add new features or modify existing ones in the web browser. They can alter the appearance of web pages, provide shortcuts or tools, block ads, manage bookmarks, improve privacy and security, and perform various other tasks including URL content redirection. Nevertheless, as web browsers undergo changes and advancements over time, the guidelines and standards governing the development of browser extensions also evolve accordingly.

Updating browser extension guidelines and standards is essential to keep extensions safe, secure, and relevant in a rapidly evolving digital landscape. As a result, a browser extension created in adherence to an earlier guideline or standard may encounter compatibility issues when used with a later guideline or standard. More specifically, the operational environment in which a browser extension runs can evolve, leading to potential incompatibilities between data access mechanisms in older and newer standards. For instance, while an earlier standard might have permitted a browser extension to access specific data while it ran as a background task, a subsequent standard could restrict such access to the same data when the extension is operating in the background. Where such incompatibilities exist in a browser extension that performs URL content redirection, the manner in which the browser extension operates may need to be revised or updated in a way that maintains backward compatibility with established URL content redirection procedures. As a result, certain functions that were previously executed in the background according to an earlier standard may be modified to run as foreground tasks in compliance with a more recent standard. In the realm of browser extensions, browser extension popup windows can be employed to achieve this functionality.

Developers often utilize browser extension popup windows (e.g., a small graphical user interface element), to provide additional information, features, or interactions to the user while they are browsing the web. Browser extension popup windows can be triggered in response to specific user actions, such as clicking on the extension's icon in the browser's toolbar, pressing a keyboard shortcut, or interacting with a webpage element. In accordance with examples of the present disclosure, a browser extension popup window can be triggered to update or obtain URL content redirection rules. In some examples, the browser extension popup window (e.g., a process corresponding to the browser extension popup window) can communicate with another application to obtain the URL content redirection rules. For example, when triggered, the browser extension popup window can request the URL content redirection rules from another application via an application programming interface (API). Similarly, the browser extension popup window can receive the URL content redirection from the same application or another application via an API in response to the request, which may be the same as or different from the API used to make the request. The browser extension popup window can then store the URL content redirection rules in a location accessible by the browser extension for further use and processing. Accordingly, the use of the browser extension popup window can maintain backward compatibility with established URL content redirection procedures implemented by the browser extension.

FIG. 1 depicts a block diagram of a VDI system 100 in which one or more embodiments of the present disclosure may be implemented. VDI system 100 comprises a client device 104, one or more connection servers 150, and a data center 102, connected by a network 146. Network 146 may be, for example, a direct link, a local area network (LAN), a wide area network (WAN) such as the Internet, another type of network, or any combination thereof.

Client device 104 is shown as a physical device, such as a general purpose desktop computer or mobile computer. A mobile computer may be, for example, a laptop, a mobile phone, or a tablet computer. In another example, client device 104 may be a virtual device running on a physical device. Client device 104 includes VDI client 134, operating system (OS) 132, and local applications 133. In examples, VDI client 134 runs on top of OS 132. OS 132 may be a standard, commodity operating system.

VDI client 134 is a user-side interface of a virtualized desktop running on one of virtual machines (VMs) 120. As used herein, a "virtualized desktop," "virtual desktop," or "remote desktop" is a desktop running on one of VMs 120 that is displayed remotely on client device 104, as though the virtual desktop were running on client device 104. One example of a virtual desktop application is Horizon Client™ made commercially available from VMware, Inc. of Palo Alto, California. By opening VDI client 134, a user of client device 104 accesses, through network 146, a virtual desktop running in remote data center 102, from any location, using client device 104. Frames of the virtual desktop running on VM 120 are transmitted to VDI client 134 at a certain frame rate using a remote display protocol such as VMware® Blast™, PCOIP® or Microsoft® Remote Desktop Protocol (RDP)™. After transmission, the frames are displayed on client device 104 for interaction by a user. Client device 104 sends user inputs to VM 120 for processing on VM 120 of data center 102, taking processing load off client device 104. Such centralized and automated management of virtual desktops provides increased control and cost savings. VDI client 134 may be, for example, VMware® View™, or a special purpose thin client such as those available from Dell, HP, NEC, Sun Microsystems, Wyse, and others.

Client device 104 may include one or more local applications 133 installed thereon. Illustrative examples of local applications include internet browsers, word processing applications, image and/or video editing tools, and the like. Examples of internet browsers include, but are not limited to, Microsoft® Edge, Microsoft® Internet Explorer™, Google® Chrome™, or Mozilla® Firefox™. In some examples, URL redirection rules located at client device 104 may cause a URL to be redirected from a browser of client device 104 to a browser on a virtual desktop (e.g., VM $120_1$). Though certain aspects are discuss with respect to a virtual desktop running on a VM, the virtual desktop may run on any suitable virtual or physical device. As the user interacts with the virtual desktop, such as using a mouse and keyboard, the user input is redirected by VDI client 134 to VDI agent 124.

Data center 102 includes host(s) 105, a virtualization manager 130, a gateway 136, a management network 128, and a data network 118. Although the management and data network are shown as separate physical networks, in some implementations the management network is logically isolated from the data network using different virtual local area network (VLAN) identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host 105. Hypervisor 116 may run on top of the OS in host 105. In some embodiments, hypervisor 116 can be installed as system level software directly on hardware platform 106 of host 105 (often referred to as "bare metal" installation) and be conceptually interposed between the physical hardware and the guest OSs 122 executing in VMs 120. In some implementations, hypervisor 116 may comprise system level software as well as a "Domain 0" or "Root Partition" VM, which is a privileged machine that has access to the physical hardware resources of host 105. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123 and a VDI agent 124. Application(s) 123 and VDI agent 124 run on top of guest OS 122. Guest OS 122 may be a standard, commodity operating system. An application 123 may be any software program, such as an internet browser application.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the virtual desktop running on VM 120 that contains VDI agent 124. An image frame includes information on appearance of the virtual desktop running on VM 120, and that information may include pixel color and location information. In addition to an image frame, VDI agent 124 may also transmit metadata of that frame to VDI client 134. The metadata may include x and y coordinate locations of a mouse cursor, x and y coordinates and size of windows of application(s) 123 open on the virtual desktop, which application(s) 123 are running on and/or displayed on the virtual desktop of VM 120, and other information.

Hardware platform 106 of each host 105 includes components of a computing device such as one or more processors (CPUs) 108, memory 110, a network interface card including one or more network adapters, also referred to as Network Interface Cards (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 105 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 105 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory. Though not shown, each of client device 104 and connection server 150 may similarly include or run on a hardware platform similar to hardware platform 106.

Virtualization manager 130 communicates with hosts 105 via a network, shown as management network 128, and carries out administrative tasks for data center 102 such as managing hosts 105, managing VMs 120 running within each host 105, provisioning VMs 120, migrating VMs 120 from one host 105 to another host, and load balancing between hosts 105. Virtualization manager 130 may be a computer program that resides and executes in a server in data center 102 or, alternatively, virtualization manager 130 may run as a virtual appliance (e.g., a VM 120) in one of hosts 105. One example of a virtualization manager is the vCenter Server™ product made available from VMware, Inc. of Palo Alto, California.

Gateway 136 provides VMs 120 and other components in data center 102 with connectivity to network 146. Gateway 136 may manage external public internet protocol (IP) addresses for VMs 120, route traffic incoming to and outgoing from data center 102, and provide networking services, such as firewalls, network address translation (NAT), dynamic host configuration protocol (DHCP), and load balancing. Gateway 136 uses data network 118 to transmit data network packets to hosts 105. Gateway 136 may be a VCI, a physical device, or a software module running within host 105. Gateway 136 may include two gateways: a management gateway for management network 128 and a data gateway for data network 118.

Connection server(s) 150 may run between data center 102 and client device 104. In some embodiments, connection server(s) 150 are in communication with data center 102 and client device 104 via network 146. Connection server(s) 150 manages and brokers connections to virtual desktops and applications by authenticating users, managing virtual desktop and application sessions, establishing secure connections between users and virtual desktops and applications, and setting and applying policies for virtual desktop sessions. In some embodiments, a connection server 150 may maintain or have access to a database of devices associated with users of a virtual desktop that have previously been enrolled. Enrolling the devices may include authenticating the devices and adding the device to the database as an approved device associated with the user for accessing the virtual desktop. In some embodiments, the connection server(s) 150 may include (e.g., store) URL redirection rules and virtual desktop configuration settings, where an application on client device 104 (e.g., VDI client 134, local applications 133) or associated with a virtual desktop (e.g., VM 120) can retrieve such information from connection server(s) 150. In examples, a URL redirection rule can include a URL pattern to be matched (e.g., *.example.com/* would match all URLs and subdomains under example.com) and a destination address, such as a destination URL or address of the VM 120).

In some embodiments, URL redirection rules associated with a browser of a client device 104 may cause a URL to be redirected from the browser of the client device 104 to the browser of the virtual desktop (e.g., VM $120_1$). For example, a URL entered into or clicked by a user at a browser of the client device 104 may match one or more URL redirection rules; as such a browser extension can cause a browser at the virtual desktop (e.g., VM $120_1$) to open or launch, navigate to the URL, and display content associated with the URL to a remote browser window displayed at the client device 104. In some embodiments, URL redirection rules associated with a browser of a virtual desktop (e.g., VM $120_1$) may cause a URL to be redirected from the browser of the virtual desktop (e.g., VM $120_1$) to a browser of client device 104. For example, a URL entered into or clicked by a user at a browser on the virtual desktop may match one or more URL redirection rules; as such a browser extension can cause a browser at the client device 104 to open, launch, or otherwise obtain a UI focus; the URL entered into the browser of the virtual desktop (e.g., VM $120_1$) is then provided to the browser of the client device 104 such that the browser on the client device 104 navigates to the URL and displays content associated with the URL.

Figure 2A:
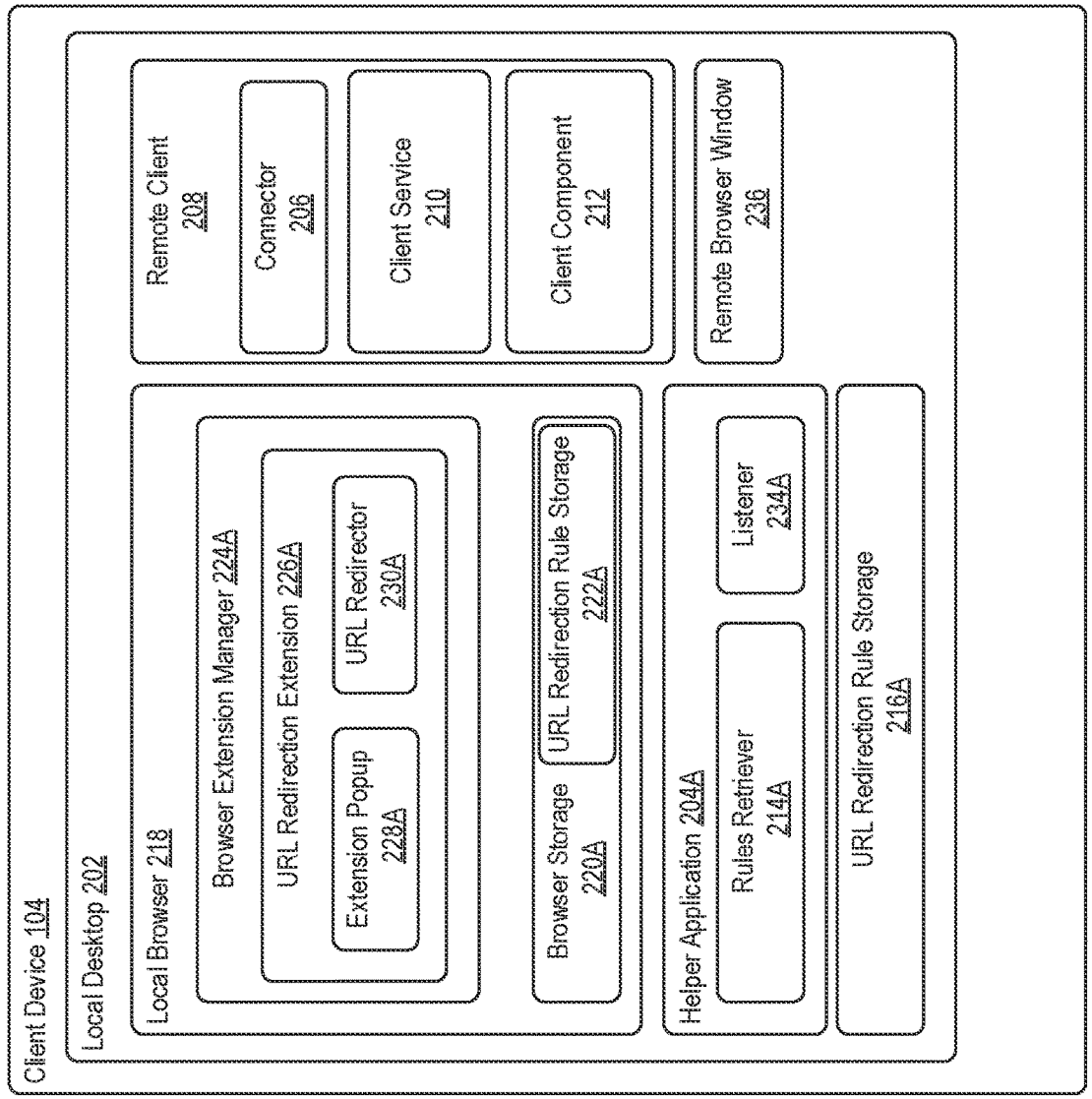
FIGS. 2A-2B illustrate an example client desktop and virtual desktop for updating URL redirection rules for a browser extension, redirecting a URL, and displaying content associated with the redirected URL, according to an example of the present disclosure.
Figure 2B:
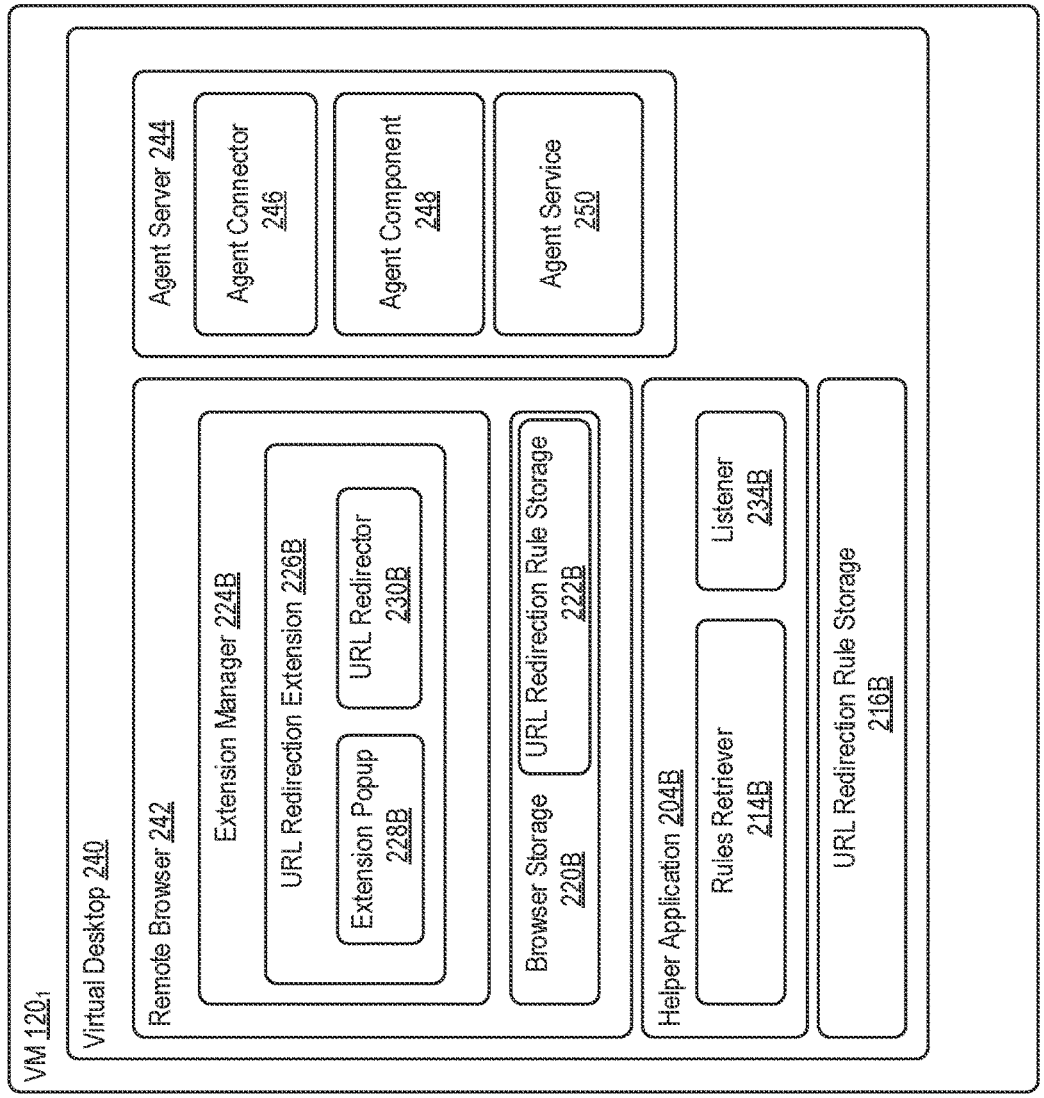

FIGS. 2A and 2B illustrate an example client device and virtual desktop for updating URL redirection rules for a browser extension, redirecting a URL, and displaying content associated with the redirected URL, according to an example embodiment of the present disclosure. Details of the components illustrated in FIGS. 2A and 2B may be further understood with respect to the example operations 300 in the call flow diagrams illustrated in FIGS. 3A-3E and described in more detail below.

As shown in FIG. 2A, a local browser 218 operates at a local desktop 202 of client device 104. Local browser 218 can be an application 133 as previously described in FIG. 1 and includes a browser extension manager 224A, where browser extension manager 224A is a software tool or component that enables users to manage, install, configure, update, and uninstall browser extensions or add-ons within local browser 218. In examples, browser extensions are software applications, generally small in size, which add specific features, functionalities, or customizations to a web browser and can enhance the browsing experience of a user by adding new tools, modifying the appearance of websites, or automating certain tasks. In some examples, browser extension manager 224A manages a URL redirection extension 226A configured to redirect a URL that matches a URL redirection rule, where a URL that matches a URL redirection rule can be redirected to a browser of a different desktop, such as a virtual desktop 240 of VM $120_1$. The remote browser window 236 then displays the browser UI from the different desktop, such as virtual desktop 240 of VM $120_1$, at the local desktop 202. URL Redirection extension 226A can include a URL redirector 230A and a browser extension popup 228A. Browser extension popup 228A can be invoked by URL redirection extension 226A in response to receiving user input by local browser 218. In examples, browser extension popup 228A can be configured to perform one or more dynamic data retrieval processes to request URL redirection rules and store the requested URL redirection rules in redirection rule storage 222A that is a storage location accessible by local browser 218, For example, the redirection rule storage 222A is part of browser storage 220A. Although depicted as residing within browser extension manager 224A, URL redirection extension 226A can reside outside of browser extension manager 224A while still being in communication with browser extension manager 224A and local browser 218. Similarly, browser storage 220A can be a storage location that is accessible by local browser 218 and one or more components of URL redirection extension 226A, such as browser extension popup 228A and URL redirector 230A.

Local desktop 202 can also include a remote client 208, remote browser window 236, a helper application 204A, and redirection rule storage 216A. Remote client 208 can communicate with connection server(s) 150 and/or an agent server 244 of virtual desktop 240 to establish, manage, and communicate with a virtual desktop session between local desktop 202 and virtual desktop 240. Remote client 208 can include connector 206, client service 210, and client component 212. Connector 206 connects to virtual desktops, such as that are hosted on or otherwise accessible by connection server(s) 150, and works in conjunction with the agent connector 246 to establish and manage the virtual desktop session. Client service 210 works in connection with an agent service 250 and an agent component 248 to manage the remote display of virtual desktops and applications using one or more remote display protocols, such as PC over IP (PCoIP™), Blast™, or remote desktop protocol (RDP). Upon connection to a virtual desktop, client service 210 can initialize a remote display connection, receive an encoded video stream over network 146 from virtual desktop 240, decode the video stream, and display the video stream, for example within the remote browser window 236. Client component 212 can capture and transmit keyboard input and other user interactions between the local desktop 202 and the virtual desktop 240. For example, cursor coordinates of a mouse click within the remote browser window 236 can be encoded and transmitted to the virtual desktop 240.

Helper application 204A can perform an initial communication, such as with connection server(s) 150, to obtain one or more URL redirection rules and virtual desktop connection settings for use by remote client 208. Alternatively, or in addition, the URL redirection rules and desktop settings may be located (e.g., stored) at the client device 104; helper application 204A can access these URL redirection rules and virtual desktop settings directly from the client device 104. In some examples, the URL rules and desktop setting can be obtained from a device that is different from the connection server(s) 150 and client device 104. Such URL redirection rules can be stored in redirection rule storage 216A. In some examples, redirection rule storage 216A corresponds to a local database or registry. Helper application 204A also initiates the remote client 208 in response to a URL matching a URL redirection rule. Further, helper application 204A can include a rules retriever 214A and listener 234A. Rules retriever 214A can retrieve URL redirection rules from redirection rule storage 216A and store the retrieved URL redirection rules in redirection rule storage 222A. Listener 234A monitors redirection rule storage 216A for changes; if a change to one or more redirection rules occurs in redirection rule storage 216A, listener 234A can invoke a notification to a user.

As shown in FIG. 2B, a remote browser 242 operates at virtual desktop 240 of VM $120_1$. Remote browser 242 includes a browser extension manager 224B that manages a URL redirection extension 226B configured to redirect a URL that matches a URL redirection rule, where a URL that matches a URL redirection rule can be redirected to a browser of a different desktop, such as local browser 218 of local desktop 202. Local browser 218 then displays the content associated with the redirected URL. As remote browser 242 may be the same as or similar to local browser 218, browser extension manager 224B, URL redirection extension 226B, browser extension popup 228B, URL Redirector 230B, browser storage 220B, and redirection rule storage 222B may operate in a manner that is the same as or similar to browser extension manager 224A, URL redirection extension 226A, browser extension popup 228A, URL Redirector 230A, browser storage 220A, and redirection rule storage 222A as previously described. Furthermore, helper application 204B, rules retriever 214B, listener 234B, and redirection rule storage 216B may operate in a manner that is the same as or similar to helper application 204A, rules retriever 214A, listener 234A, and redirection rule storage 216A as previously described.

Virtual desktop 240 includes agent server 244, which can communicate with connection server(s) 150 and/or remote client 208. Agent server 244 can include agent connector 246, agent component 248, and agent service 250. Agent connector 246 may receive a request, such as from connection server(s) 150, or connector 206, to initiate a remote connection. Agent connector 246 prepares a user session and causes agent component 248 to establish a secure communication channel between the agent service 250 and client service 210. Agent service 250 can launch remote browser 242, causing remote browser 242 to navigate to a redirected URL. Agent service 250 also captures information (e.g., pixels) of remote browser 242 from virtual desktop 240, encodes them using a remote display protocol, such as PC over IP (PCoIP™), Blast™, or Remote Desktop Protocol (RDP), and sends encoded data over network 146 to the client device 104. The client device then decodes the data and renders the data to the local desktop 202. While remote client 208 was described as communicating with connection server(s) 150 to establish, manage, and communicate with a virtual desktop session between local desktop 202 and virtual desktop 240, in some examples, remote client 208 can directly connect to agent server 244 without communicating with or using connection server(s) 150.

FIGS. 3A-3E illustrate a call flow diagram with example operations for updating URL redirection rules for a browser extension and redirecting a URL, according to an example of the present disclosure.

Figure 4:
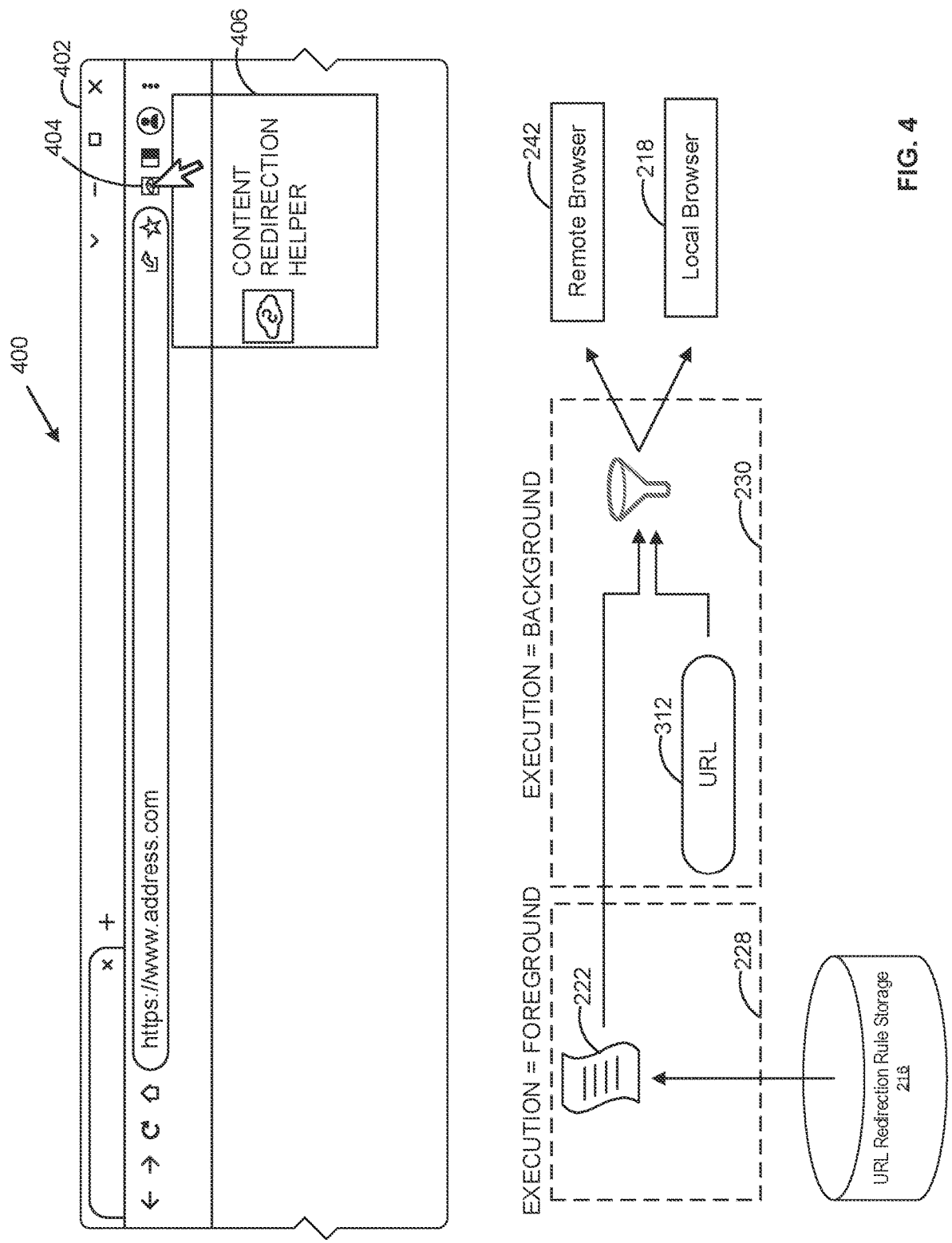
FIG. 4 depicts a conceptual diagram of an example user interface (UI) for updating URL redirection rules for a browser extension according to an example of the present disclosure.

Prior to the activation of URL redirection extension 226 for the purpose of redirecting URLs that match a specified URL redirection rule, URL redirection extension 226 is installed and enabled in a web browser. This applies to both local browsers like 218 and remote browsers like 242. In certain scenarios, browser extension popup 228 becomes operational during operation 302. The initiation of browser extension popup 228 can occur when it is enabled within a browser extension manager, such as the browser extension manager 224 or when a user clicks on a browser extension icon in a browser as illustrated in FIG. 4. Alternatively, or in addition, the browser extension popup 228 can be triggered when a web browser, like browser 218 or 242, is launched, initiated, or opened. Upon invoking browser extension popup 228, browser extension popup 228 communicates with helper application 204 and requests URL redirection rules at operation 304. In examples, browser extension popup 228 can request URL redirection rules using an application programming interface, remote procedure call, networking protocol, or other communication method to communicate with helper application 204. At operation 306, helper application 204 accesses URL redirection rules from redirection rule storage 216. Helper application 204 provides the URL redirection rules to browser extension popup 228 at operation 308. At operation 310, browser extension popup 228 stores the URL redirection rules at a location accessible to the browser, such as redirection rule storage 222.

In order to execute URL redirection, URL redirector 230 receives a URL 312 at operation 314. In various scenarios, URL 312 is obtained when a user enters a URL into a web browser, clicks on a URL within a web browser or another application, or through alternative methods. At operation 316, URL redirector 230 accesses URL redirection rules from redirection rule storage 222. URL redirector 230 determines, at operation 318, if URL 312 matches a URL redirection rule contained within the URL redirection rules. For example, if URL 312 is "subdomain.example.com/document.pdf", URL 312 would match a URL associated with the URL redirection rule patterned as "*.example.com/*" In this URL redirection rule, the asterisk "*" stands in for any subdomain under the domain "example.com" as well as any specific files or directories that follow the domain, such as "document.pdf." As another example, if a URL is "thirdleveldomain.secondleveldomain.exampledomain-.com/financials.xls", the URL would match a URL associated the with URL redirection rule patterned as "*.secondleveldomain.example.com/*", where the asterisk "*" stands in for any level of domain under the domain "secondleveldomain.example.com" as well as any specific files or directories that follow the domain, such as "financials.xls." Accordingly, a URL may be considered "associated with" a URL redirection rule if the URL matches the URL redirection rule, such as if the URL matches a pattern of the URL redirection rule. Further, a URL redirection rule may be associated with one or more URLs, as in any one or more URLs that match the URL redirection rule. If URL 312 matches a URL associated with one or more URL redirection rules, then URL redirector 230 initiates an operation to cause URL 312 to be opened, browsed, or viewed using a web browser of a different desktop. For example, where URL 312 is received at local browser 218 of local desktop 202, URL redirector 230 causes URL 312 to be opened or viewed at remote browser 242 of virtual desktop 240, and rendered in remote browser window 236 as further described with respect to FIG. 3B. Alternatively, or in addition, where URL 312 is received at remote browser 242 of virtual desktop

Figure 3A:
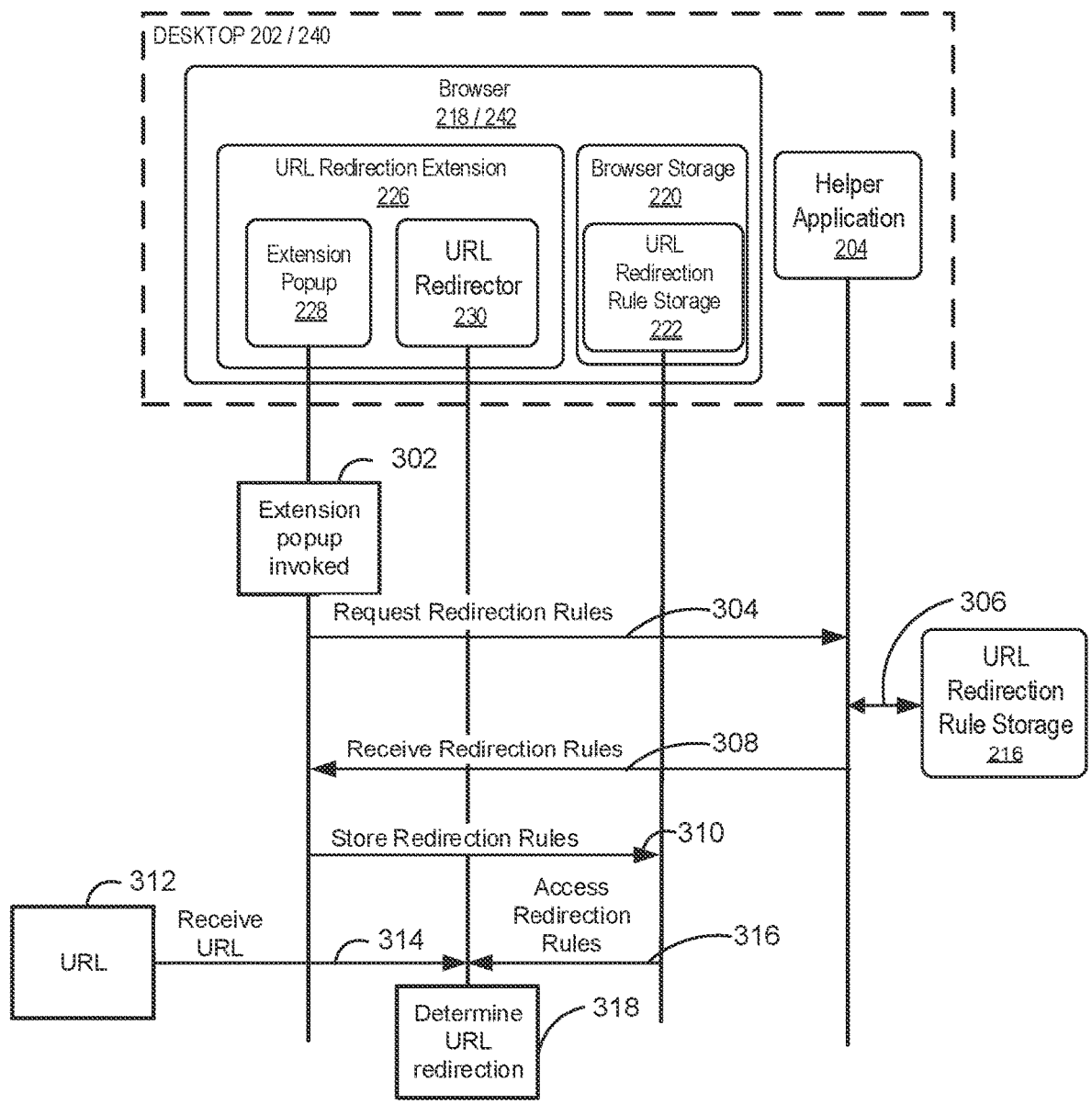
FIGS. 3A-3E illustrate call flow diagrams with example operations for updating URL redirection rules for a browser extension and redirecting a URL.
Figure 3B:
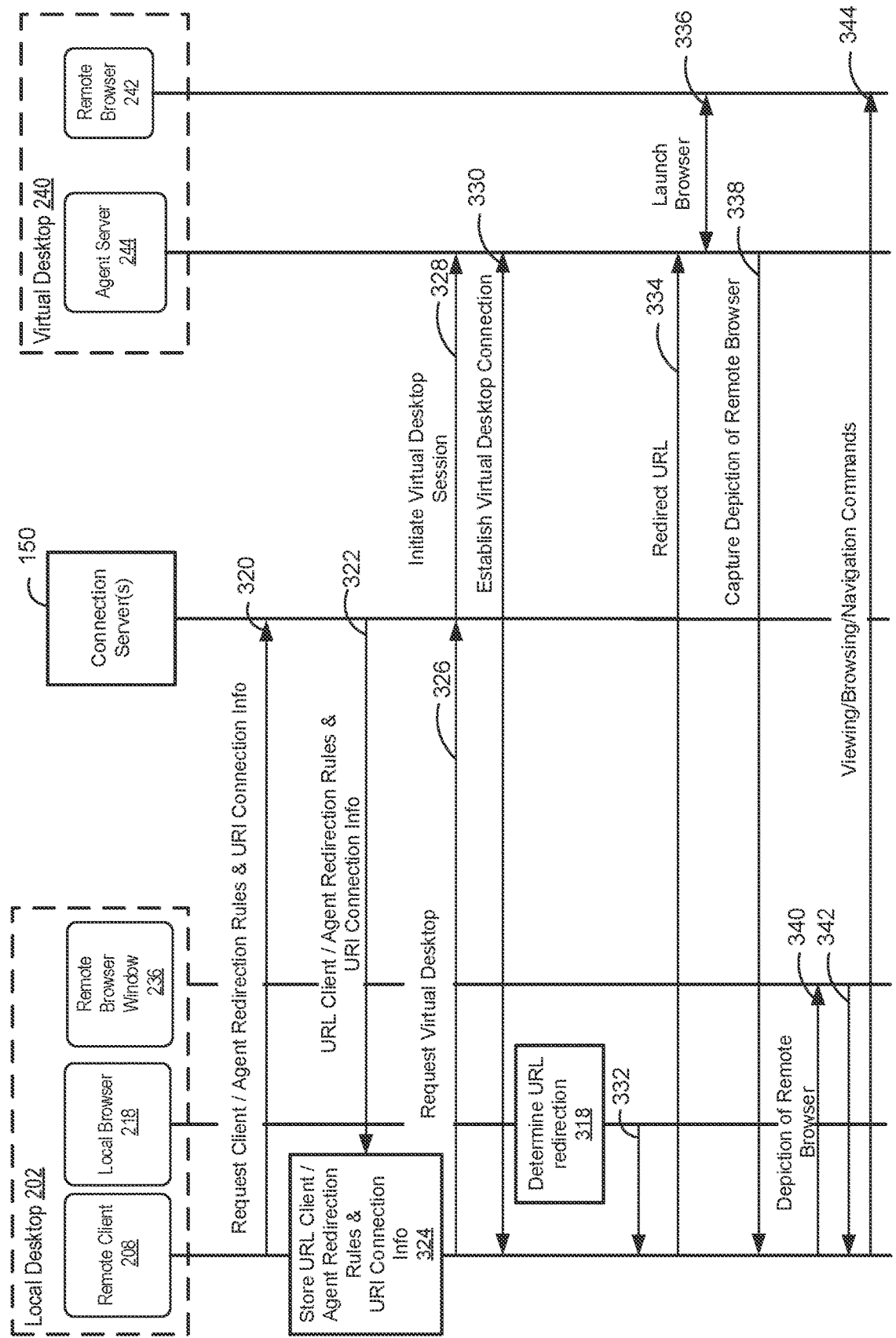
Figure 3C:
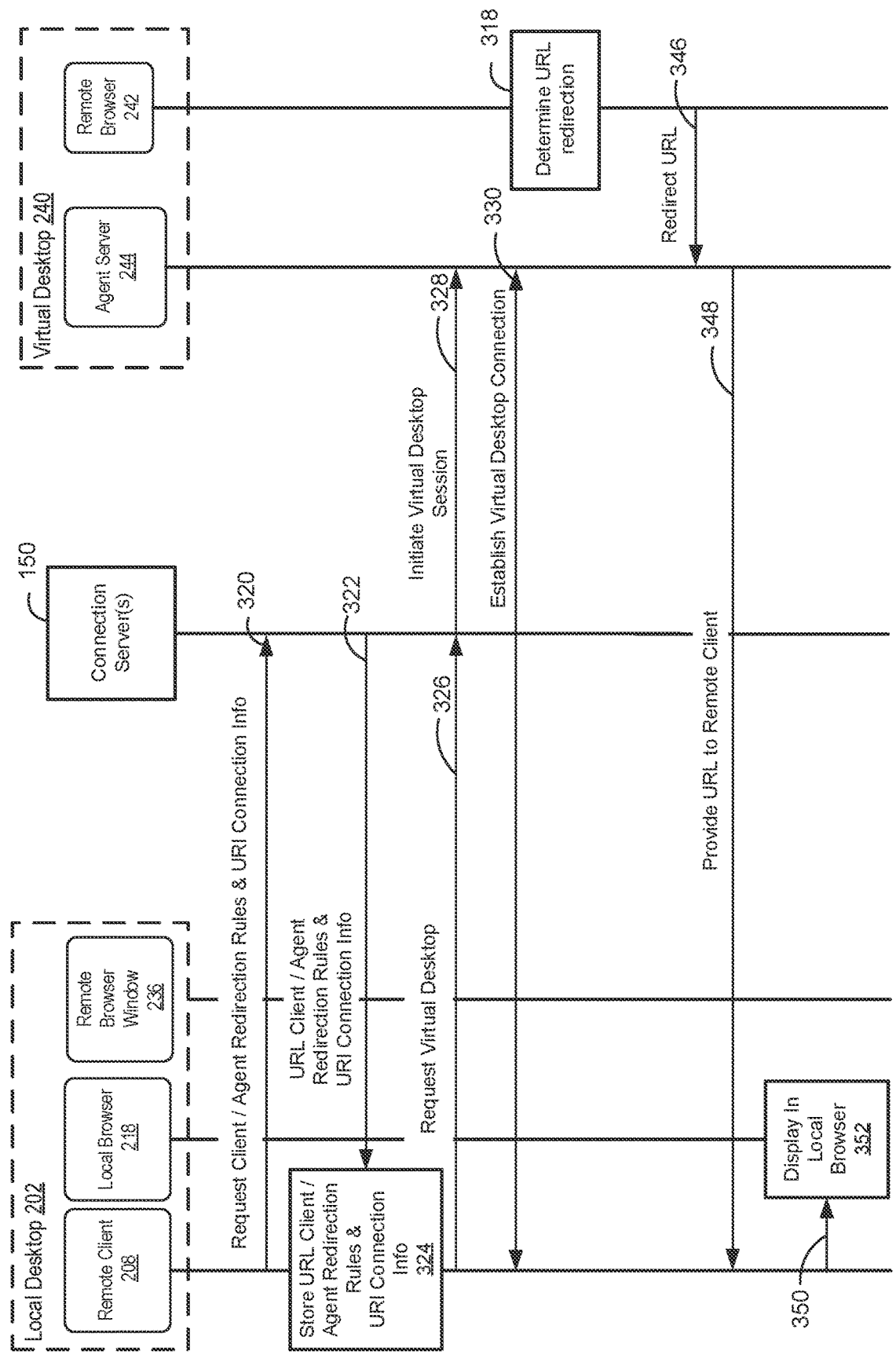

240, URL redirector 230 causes URL 312 to be opened or viewed at local browser 218 of local desktop 202, as further described with respect to FIG. 3C.

FIG. 3B depicts additional details directed to redirecting a URL from local browser 218 to remote browser 242. At operation 320, remote client 208 communicates with connection server(s) 150 and requests URL redirection rules and virtual desktop connection information. At operation 322, remote connection server(s) 150 provides URL redirection rules and virtual desktop connection information to remote client 208, where remote client 208 stores URL redirection rules and virtual desktop connection formation at operation 324. At operation 326, remote client 208 communicates with connection server(s) 150 to request a virtual desktop session. In examples, remote client 208 requests a virtual desktop session in response to URL 312 matching a URL redirection rule. In some examples, remote client 208 requests a virtual desktop session in response to another action or operation, such as but not limited to the launch, initiation, or opening of local browser 218. At operation 328, connection server(s) 150 routes the request for a virtual desktop session to agent server 244 of virtual desktop 240. Agent server 244 works with remote client 208 to establish a virtual desktop connection between local desktop 202 and virtual desktop 240 at operation 330.

At operation 318, local browser 218 determines that URL 312 matches a URL redirection rule; in some examples, upon a URL match, local browser 218, or an application communicating with local browser 218, redirects URL 312 to remote client 208 at operation 332. At operation 334, remote client 208 provides URL 312 to agent server 244. Agent server 244 causes an instance of remote browser 242 to launch and navigate to a location specified by URL 312 at operation 336. At operation 338, information (e.g., pixels) of remote browser 242 are captured by agent server 244 and provided to remote client 208. Remote client 208 causes remote browser window 236 to display the remote browser 242 at operation 340. A user may interact with remote browser window 236 such that a user can provide viewing, browsing, and navigation commands (e.g., scroll clicks, additional URL clicks, and document navigation commands) to the remote browser 242; such commands are provided to the remote browser 242 via the remote client 208 through operations 342 and 344. Responsive to the viewing commands, information (e.g., pixels) of remote browser 242 are captured by agent server 244 and provided to remote client 208 at 338, where remote client 208 causes remote browser window 236 to display remote browser 242 at operation 340.

FIG. 3C depicts additional details directed to redirecting a URL from remote browser 242 to local browser 218. Operations 320 to 330 were previously described with respect to FIG. 3B. At operation 318, remote browser 242 determines that URL 312 matches a URL redirection rule; in some examples, upon a URL match, remote browser 242, or an application communicating with remote browser 242, redirects URL 312 to agent server 244 at operation 346. At operation 348, agent server 244 provides URL 312 to remote client 208. Remote client 208 then provides or otherwise causes an instance of local browser 218 to launch and navigate to a location specified by URL 312 at operation 350. Accordingly, content associated with URL 312 is displayed in local browser 218 at operation 352.

Figure 3D:
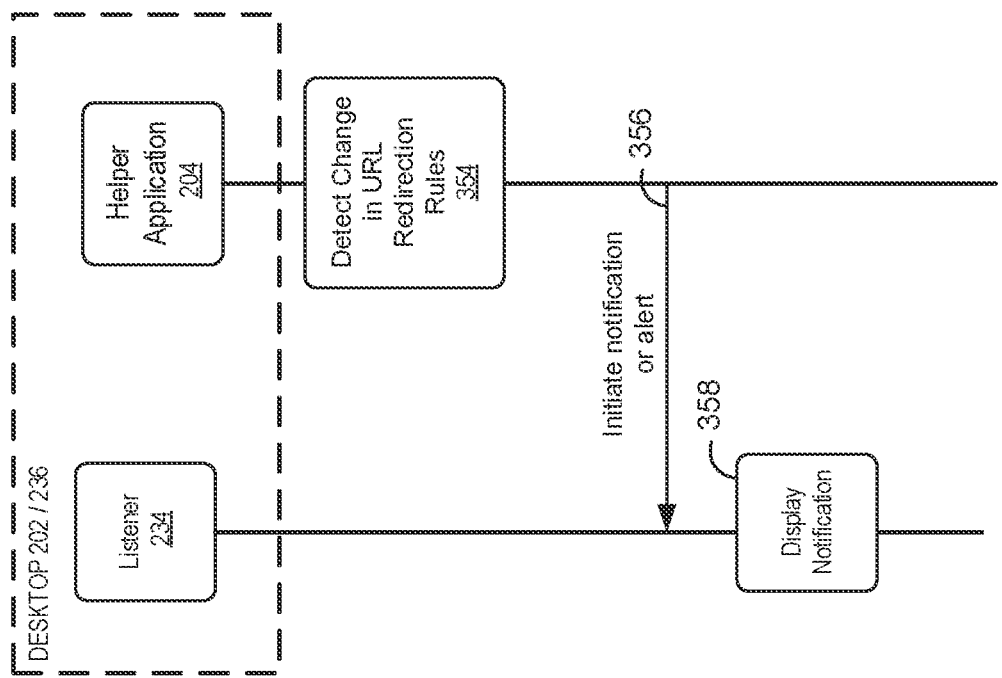
Figure 5:
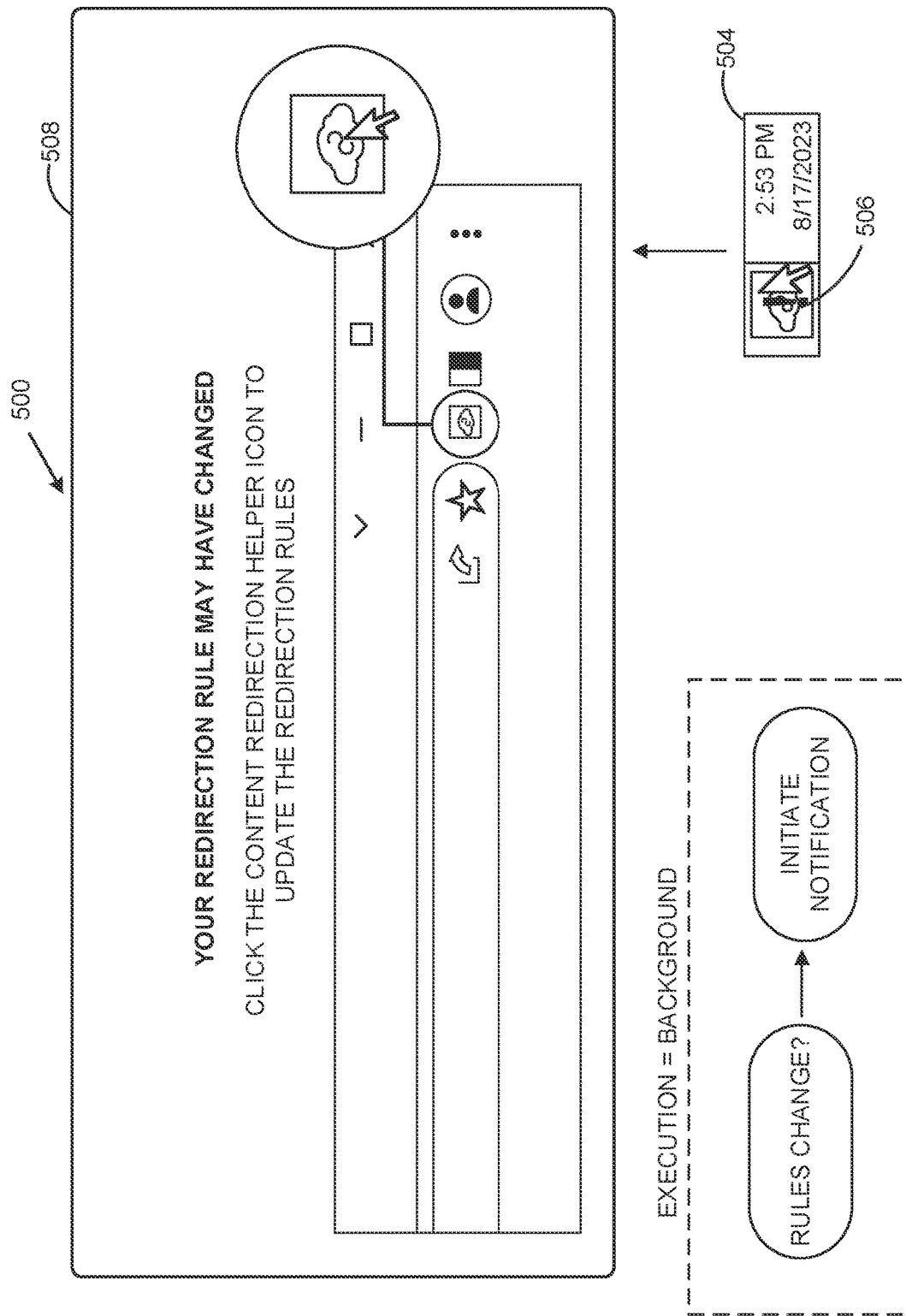
FIG. 5 depicts a conceptual diagram of an example user interface (UI) for initiating and displaying a notification according to an example of the present disclosure.

FIG. 3D depicts additional details for monitoring a change in URL redirection rules and in response to detecting a change, causing a notification to be displayed to a user. At operation 354, helper application 204 can detect a change in the URL redirection rules. For example, the URL redirection rules can be periodically checked at predefined intervals. In examples, helper application 204 can fetch the URL redirection rules and compare them to a previously stored version. If there are any differences, helper application 204 can initiate a notification or alert at operation 356. At operation 358, a notification can be displayed to a user. In examples, the notification can be displayed in a notification area of a taskbar or toolbar, as depicted in FIG. 5. Accordingly, a user can invoke browser extension popup 228 in response to the notification to initiate operation 302 as previously described.

Figure 3E:
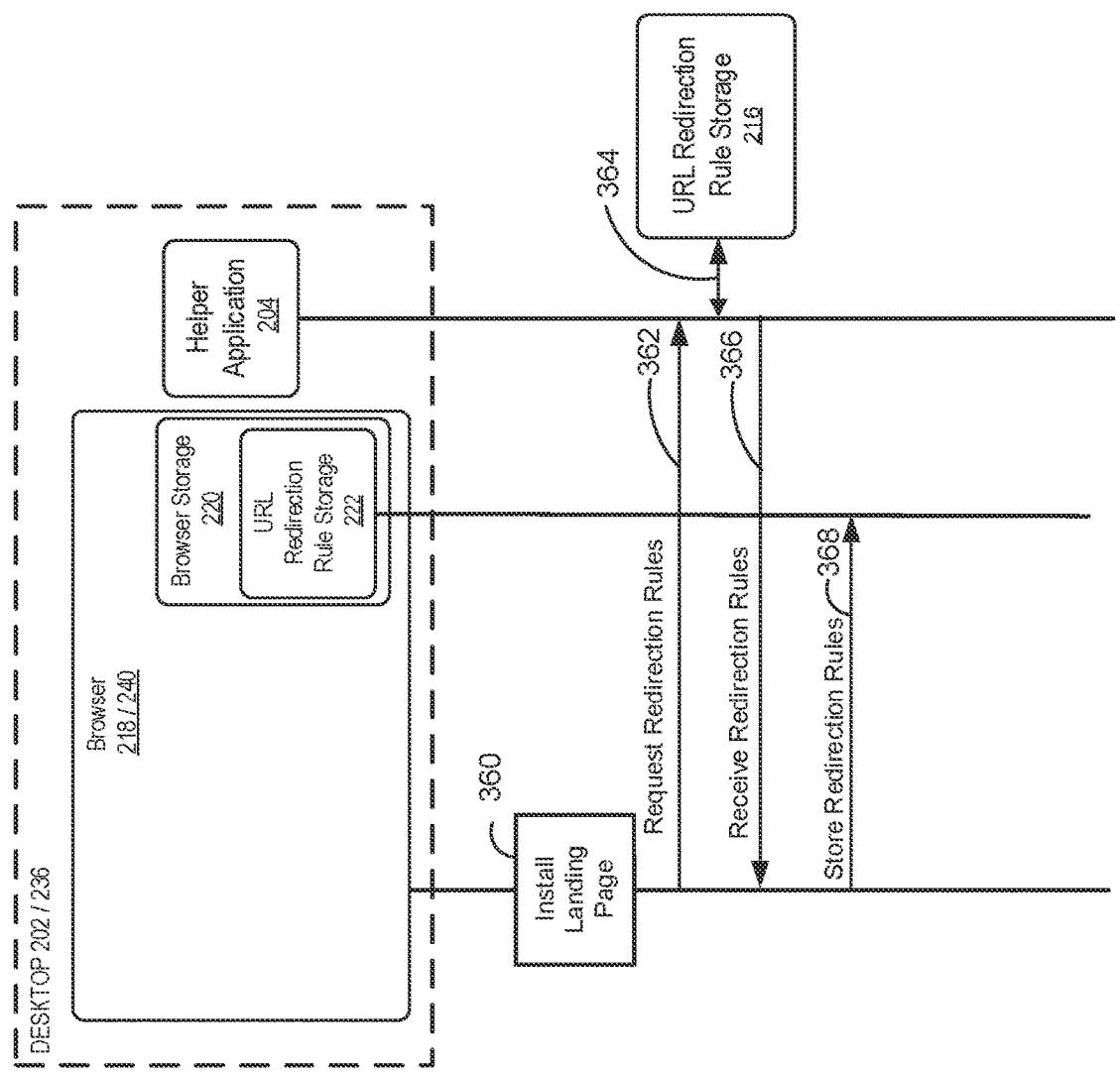

FIG. 3E depicts additional details for automatically updating URL redirection rules for a browser extension in response to installing a browser extension. In examples, upon completion of a browser extension install, a browser is automatically directed to an install landing page at operation 360. In examples, an install landing page can request URL redirection rules using an application programming interface, remote procedure call, networking protocol, or other communication method to communicate with helper application 204 at operation 362. At operation 364, helper application 204 accesses URL redirection rules from redirection rule storage 216. Helper application 204 provides the URL redirection rules to the install landing page at operation 366. At operation 368, the install landing page stores the URL redirection rules at a location accessible to the browser, such as redirection rule storage 222.

FIG. 4 depicts a conceptual diagram 400 of an example user interface (UI) for updating URL redirection rules for a browser extension according to an example of the present disclosure. As shown in FIG. 4, an icon 404 can be displayed in a toolbar of a browser 402. When a user selects the icon 404, a web browser extension popup 406 is displayed. In some examples, web browser extension popup 406 is the same as or similar to the browser extension popup 228 previously described. Accordingly, upon selection of the web browser extension popup 406, operations 304 to 310 of FIG. 3A can be performed to update URL redirection rules.

As further depicted in FIG. 4, the web browser extension popup 406 can be executed in a state that is different than the execution of the web browser extension. For example, the web browser extension popup 406 can be executed in the foreground to request URL redirection rules from redirection rule storage 216 and store the URL redirection rules in redirection rule storage 222. Thus, the web browser extension popup 406 overlays at least a portion of the browser 402. The retrieval and storage of the URL redirection rules (e.g., operations 304 to 310 of FIG. 3A) can be performed in the foreground upon initiation by a user (e.g., click or selection of icon 404). In some examples, operations 314 to 318 are performed in the background. For example, URL redirector 230 receives URL 312 and compares URL 312 to URL content redirection rules to determine if the URL should be viewed at the local browser 218 or the remote browser 242.

FIG. 5 depicts a conceptual diagram 500 of an example user interface (UI) for initiating and displaying a notification according to an example of the present disclosure. In examples, helper application 204 can detect a change in URL redirection rules and cause a notification to be displayed (e.g., operation 358 of FIG. 3D). Such a notification can be displayed in a toolbar or taskbar 504 as notification or icon 506. When a user selects the notification or icon 506, a larger notification window 508 can be displayed to the user, informing the user how to select the web browser extension to initiate the URL redirection rule update process.

In some examples, the detection and notification operations (e.g., operations 354 to 358 of FIG. 3D) can be performed in the background, as depicted in FIG. 5.

Figure 6:
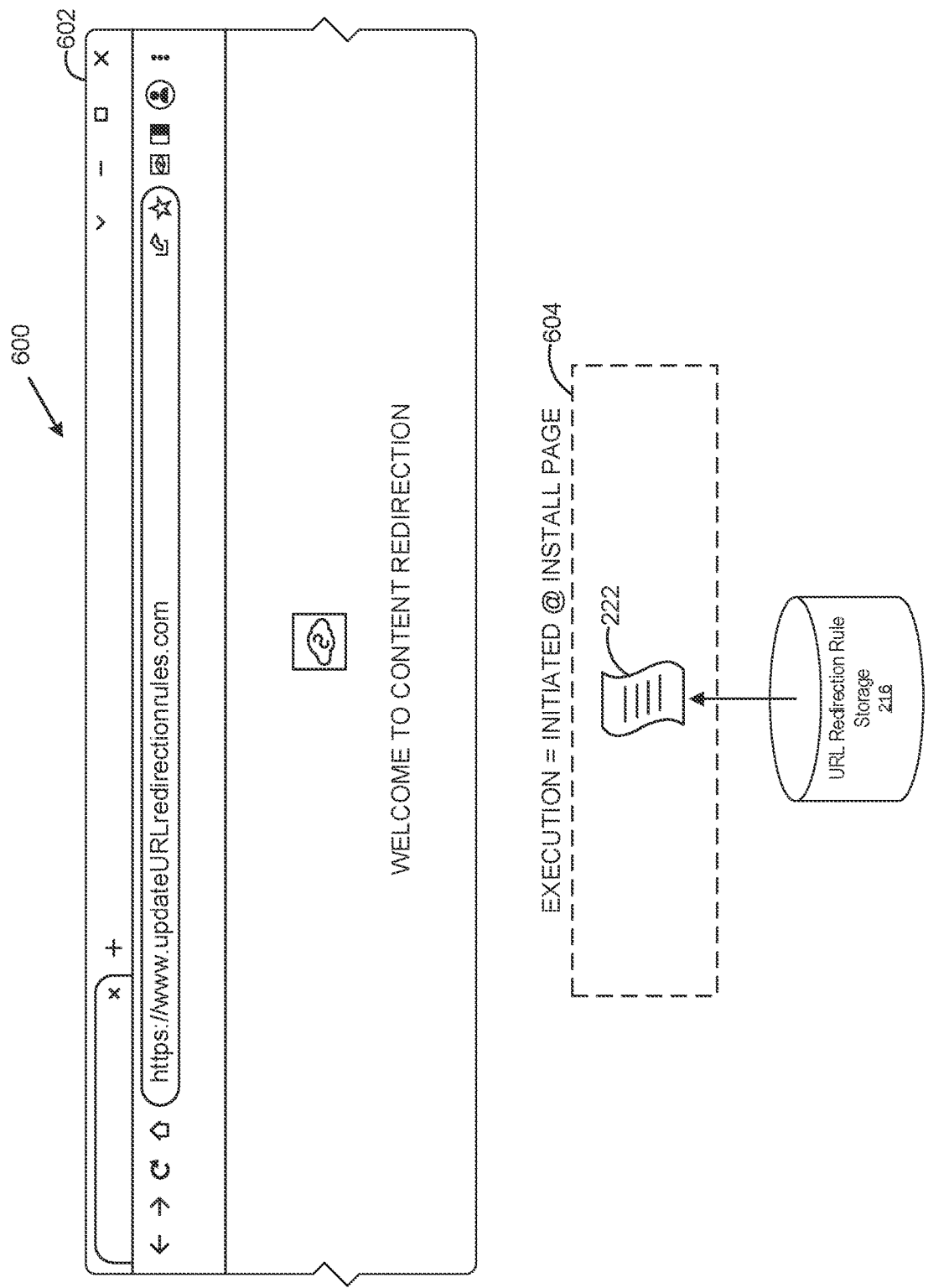
FIG. 6 depicts a conceptual diagram of an example user interface (UI) for updating URL redirection rules following the installation of a browser extension according to an example of the present disclosure.

FIG. 6 depicts a conceptual diagram 600 of an example user interface (UI) for updating URL redirection rules following the installation of a browser extension according to an example of the present disclosure. In examples, a browser 602 is redirected to an install landing FIG. 3E. Thus, helper application 204 accesses URL redirection rules from redirection rule storage 216 and provides the URL redirection rules to the install landing page 604 (e.g., operations 360-368). Thus, the install landing page 604 stores the URL redirection rules at a location accessible to the browser, such as redirection rule storage 222.

Figure 7:
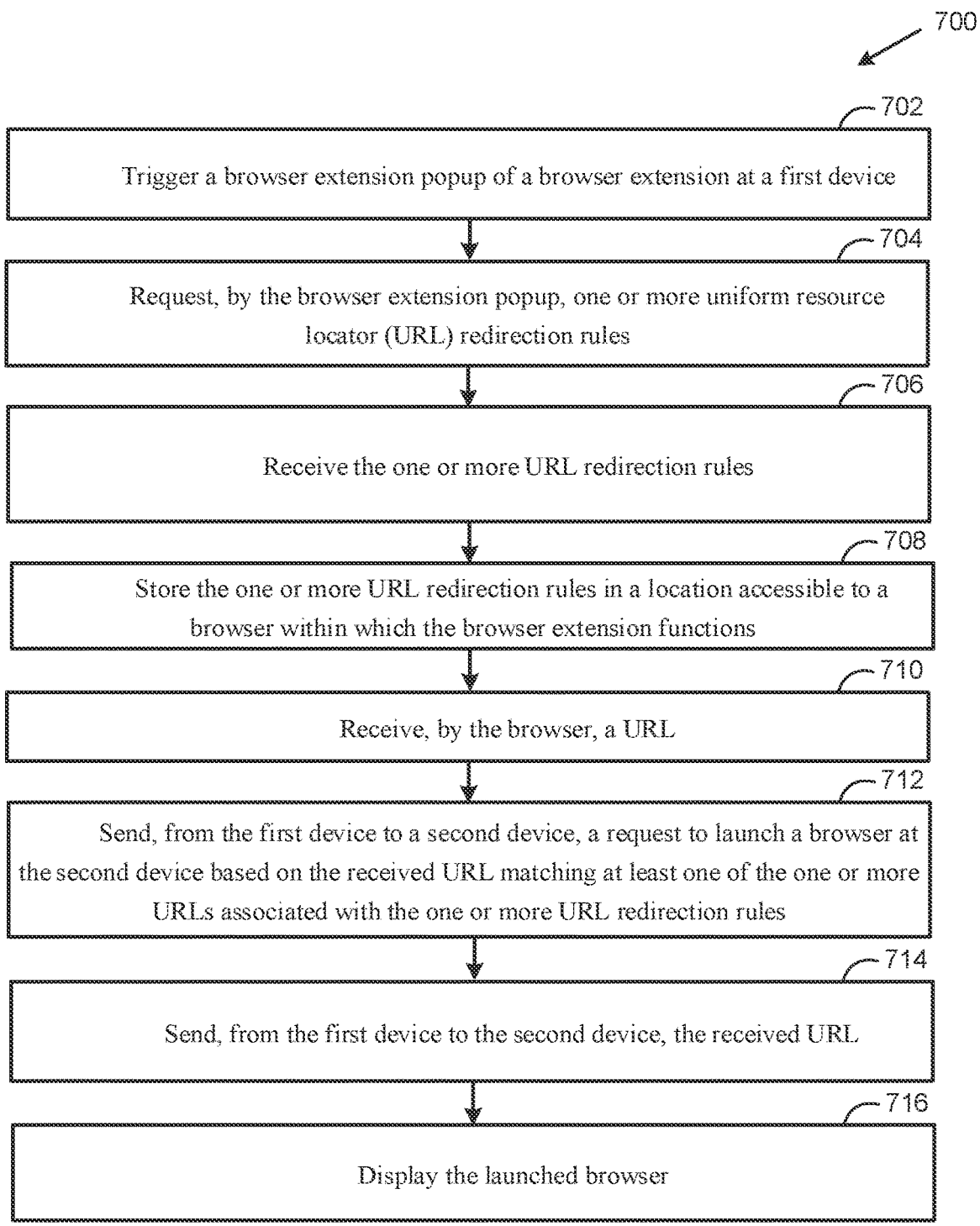
FIG. 7 is a flow diagram illustrating example operations for updating URL redirection rules in a browser extension, according to an example of the present application.

FIG. 7 is a flow diagram illustrating example operations 700 for performing URL content redirection in accordance with URL redirection rules by updating the URL redirection rules accessible by a first browser, redirecting a URL from the first browser to a second browser associated with a redirection rule, and causing the content associated with the redirected URL to be displayed via the second browser, according to an example embodiment of the present application.

At operation 702, a browser extension popup 228 of a URL redirection extension 226 may be triggered at a first device. In examples the first device is a client device 104. In some examples, the first device is VM $120_1$. At operation 704, the browser extension popup 228 requests one or more URL redirection rules, where the one or more URL redirection rules are associated with one or more URLs. At operation 706, the one or more URL redirection rules are received. In some examples, the browser extension popup 228 receives the one or more URL redirection rules.

At operation 708, the one or more URL redirection rules are stored in a location accessible to a browser within which the URL redirection extension 226 functions. In some examples, the browser extension popup stores the one or more URL redirection rules. At operation 710, a URL is received. In some examples, the URL is received at the browser. At operation 712, a request to launch a browser at a second device is sent when the received URL matches at least one of the one or more URLs associated with the one or more URL redirection rules. In some examples, the request is sent from the first device to the second device. In some examples, the second device is VM $120_1$. In some examples, the second device is client device 104.

At operation 714, the received URL is sent to the second device. In some examples, the first device sends the received URL to the second device. At operation 716, the launched browser is displayed. In some examples, the launched browser is displayed at the first device. In some examples, the launched browser displays content associated with the received URL.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for launching a browsing session, the method comprising:
    monitoring, by a native helper application operating outside of a browser on a first device, for a change in one or more uniform resource locator (URL) redirection rules, wherein the native helper application periodically requests the one or more URL redirection rules from a connection server and compares the one or more URL redirection rules received from the connection server to a previously stored version of the one or more URL redirection rules;
    in response to detecting a change in the one or more URL redirection rules by the native helper application, displaying a prompt for triggering a browser extension popup of a browser extension of the browser at the first device;
    requesting, by the browser extension popup, the one or more uniform resource locator (URL) redirection rules from the native helper application, wherein the one or more URL redirection rules are associated with one or more URLs;
    receiving the one or more URL redirection rules and storing the one or more URL redirection rules in a location accessible to the browser within which the browser extension functions;
    receiving, by the browser, a URL;
    sending, from the first device to a second device, a request to launch another browser at the second device based on the received URL matching at least one of the one or more URLs associated with the one or more URL redirection rules;
    sending, from the first device to the second device, the received URL; and
    displaying the launched browser of the second device.

2. The method of claim 1, wherein the first device is a client device and the second device is a virtual machine.

3. The method of claim 1, wherein the launched browser of the second device is displayed at the first device.

4. The method of claim 1, wherein the first device is a virtual machine and the second device is a client device.

5. The method of claim 1, further comprising displaying, at the first device, a notification indicating that the one or more URL redirection rules have changed.

6. The method of claim 1, further comprising receiving input corresponding to a user selection of an icon displayed in a toolbar of the browser, wherein the triggering the browser extension popup comprises triggering the browser extension popup in response to the input.

7. The method of claim 1, wherein the browser extension popup, when triggered, overlays at least a portion of the browser.

8. A system for launching a browsing session, the system comprising:
    at least one processor; and
    at least one memory, the at least one processor and the at least one memory configured to cause the system to:
        monitor, by a native helper application operating outside of a browser on a first device, for a change in one or more uniform resource locator (URL) redirection rules, wherein the native helper application periodically requests the one or more URL redirection rules from a connection server and compares the one or more URL redirection rules received from the connection server to a previously stored version of the one or more URL redirection rules;
        in response to detecting a change in the one or more URL redirection rules by the native helper application, display a prompt for triggering a browser extension popup of a browser extension of the browser at the first device;
        request, by the browser extension popup, the one or more uniform resource locator (URL) redirection rules from the native helper application, wherein the one or more URL redirection rules are associated with one or more URLs;
        receive the one or more URL redirection rules and store the one or more URL redirection rules in a location accessible to the browser within which the browser extension functions;
        receive, by the browser, a URL;
        send, from the first device to a second device, a request to launch another browser at the second device based on the received URL matching at least one of the one or more URLs associated with the one or more URL redirection rules;
        send, from the first device to the second device, the received URL; and
        display the launched browser of the second device.

9. The system of claim 8, wherein the first device is a client device and the second device is a virtual machine.

10. The system of claim 8, wherein the launched browser of the second device is displayed at the first device.

11. The system of claim 8, wherein the first device is a virtual machine and the second device is a client device.

12. The system of claim 8, wherein the at least one processor and the at least one memory are further configured to cause the system to display, at the first device, a notification indicating that the one or more URL redirection rules have changed.

13. The system of claim 8, wherein the at least one processor and the at least one memory are further configured to cause the system to:
   receive input corresponding to a user selection of an icon displayed in a toolbar of the browser; and
   trigger the browser extension popup of the browser extension in response to the input.

14. The system of claim 8, wherein the browser extension popup, when triggered, overlays at least a portion of the browser.

15. One or more non-transitory computer-readable storage media comprising instructions that, when executed by at least one processor of a computing system, cause the computing system to perform operations for launching a browsing session, the operations comprising:
   monitoring, by a native helper application operating outside of a browser on a first device, for a change in one or more uniform resource locator (URL) redirection rules, wherein the native helper application periodically requests the one or more URL redirection rules from a connection server and compares the one or more URL redirection rules received from the connection server to a previously stored version of the one or more URL redirection rules;
   in response to detecting a change in the one or more URL redirection rules by the native helper application, displaying a prompt for triggering a browser extension popup of a browser extension of the browser at the first device;
   requesting, by the browser extension popup, the one or more uniform resource locator (URL) redirection rules from the native helper application, wherein the one or more URL redirection rules are associated with one or more URLs;
   receiving the one or more URL redirection rules and storing the one or more URL redirection rules in a location accessible to the browser within which the browser extension functions;
   receiving, by the browser, a URL;
   sending, from the first device to a second device, a request to launch another browser at the second device based on the received URL matching at least one of the one or more URLs associated with the one or more URL redirection rules;
   sending, from the first device to the second device, the received URL; and
   displaying the launched browser of the second device.

16. The one or more non-transitory computer-readable storage media of claim 15, wherein the first device is a client device and the second device is a virtual machine.

17. The one or more non-transitory computer-readable storage media of claim 15, wherein the first device is a virtual machine and the second device is a client device.

\* \* \* \* \*